W. A. PERRY.
VALVE MECHANISM FOR FIRE EXTINGUISHING SYSTEMS.
APPLICATION FILED MAR. 25, 1915.
1,159,794.
Patented Nov. 9, 1915.
2 SHEETS—SHEET 1.
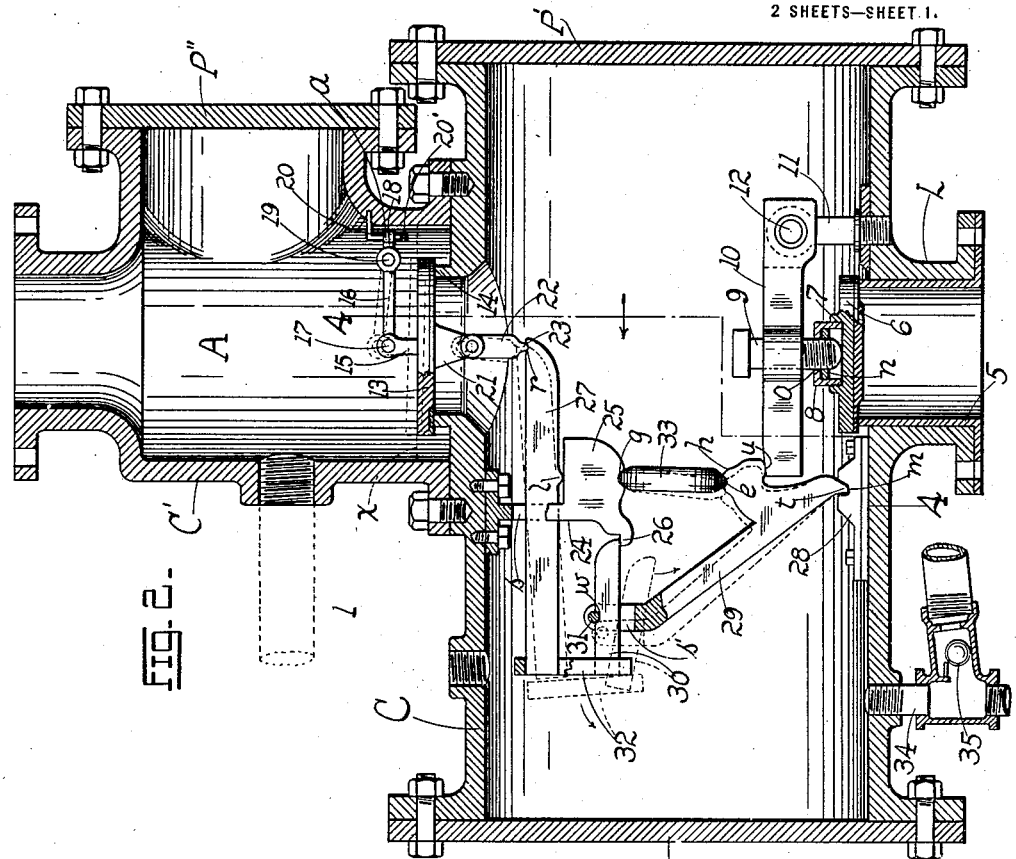
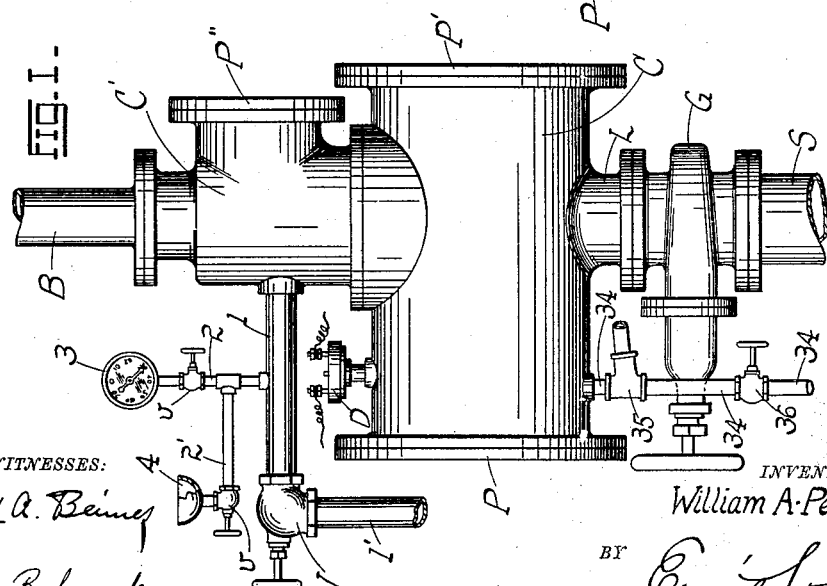
WITNESSES:
Harry A. Beines
N. L. Rohacek
INVENTOR.
William A. Perry.
BY
Emil Starn
ATTORNEY.

W. A. PERRY.
VALVE MECHANISM FOR FIRE EXTINGUISHING SYSTEMS.
APPLICATION FILED MAR. 25, 1915.
1,159,794.
Patented Nov. 9, 1915.
2 SHEETS—SHEET 2.
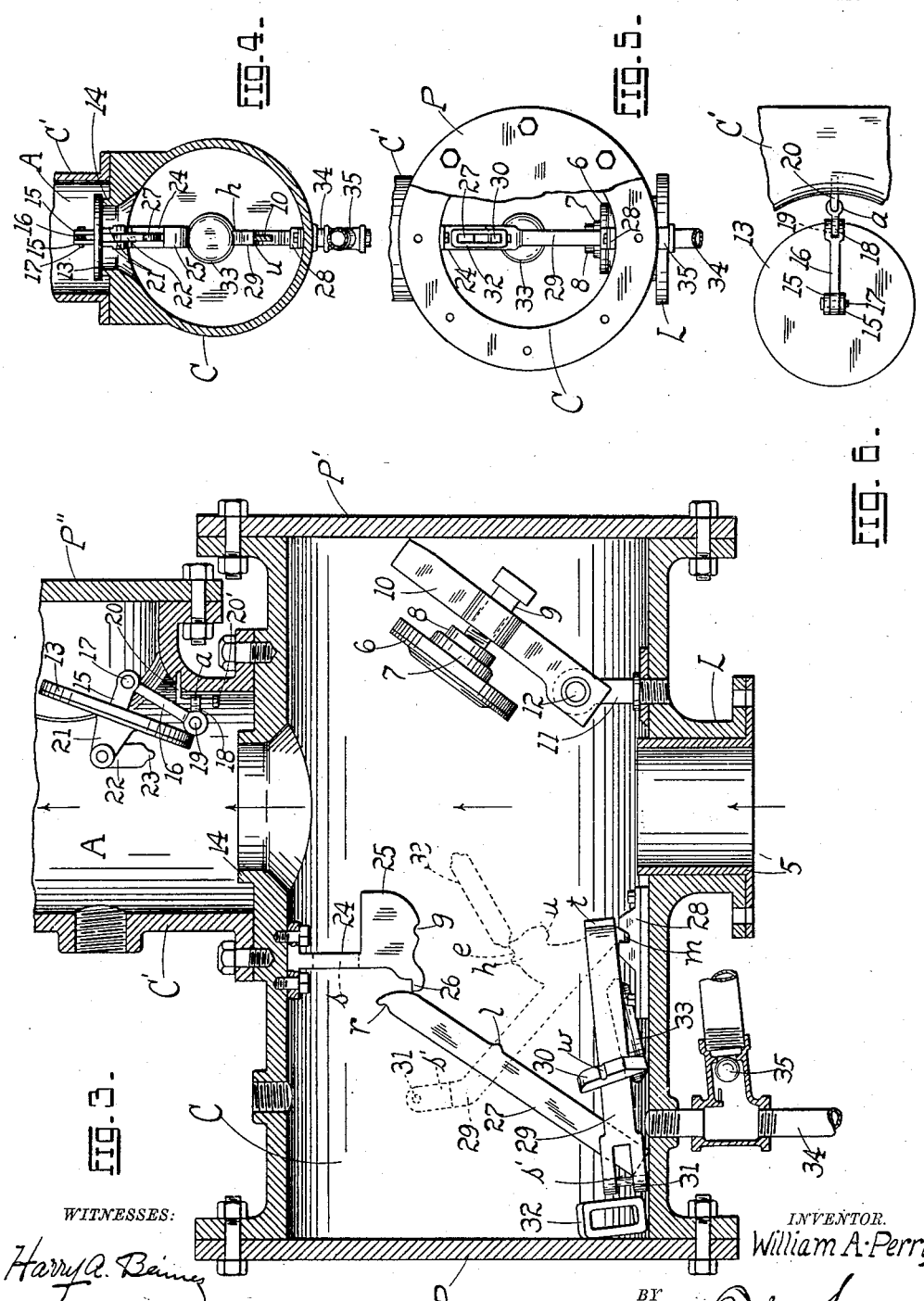
WITNESSES:
Harry A. Baines
N. L. Rohacek
INVENTOR.
William A. Perry.
BY
ATTORNEY.

UNITED STATES PATENT OFFICE.

WILLIAM A. PERRY, OF ST. LOUIS, MISSOURI.

VALVE MECHANISM FOR FIRE-EXTINGUISHING SYSTEMS.

1,159,794.        Specification of Letters Patent.        Patented Nov. 9, 1915.

Application filed March 25, 1915. Serial No. 16,963.

*To all whom it may concern:*

Be it known that I, WILLIAM A. PERRY, a citizen of the United States, residing at St. Louis, State of Missouri, have invented certain new and useful Improvements in Valve Mechanism for Fire-Extinguishing Systems, of which the following is a full, clear, and exact description, reference being had to the accompanying drawings, forming a part hereof.

My invention has relation to improvements in automatic-valve mechanisms for fire-extinguishing systems, and is directed specifically to types known as "dry-pipe sprinkler systems."

It consists in the novel features of construction more fully set forth in the specification and pointed out in the claims.

In the drawings, Figure 1 is a side elevation of the valve-casing with the necessary accessories secured thereto; Fig. 2 is a middle vertical enlarged longitudinal section through the valve-casing showing the internal valve mechanism in elevation before the latter is released; Fig. 3 is a section similar to Fig. 2, a part, however, being broken away, showing the valve mechanism after the same has been released; Fig. 4 is a reduced vertical cross-section on the line 4—4 of Fig. 2; Fig. 5 is an end view of the valve-casing with parts broken away and looking in a direction opposite to that of Fig. 4; and Fig. 6 is a plan view of the air-valve showing the manner of hinging the same.

The object of the present invention is to provide a valve for dry-pipe sprinkler systems that will be positive in its action, that is to say, one which will completely open when the pressure in the sprinkler pipes has been reduced to a predetermined amount by the opening of a sprinkler-head. As is well understood in the art, the sprinkler-heads are designed to open upon an application of heat caused by a fire in the building, and immediately upon their opening the compressed air in the pipes will escape, thus allowing the pressure in the pipes to be reduced, such reduction resulting in the opening of the valve. A further object of the invention is to obviate the necessity of any hinged construction in the releasing mechanism, such as might corrode and stick if not operated often, thus deterring or preventing the opening of the valve: a further object is to provide a construction wherein the parts are few and readily accessible, thus permitting convenient inspection. Further advantages will be better apparent from a detailed description of the invention, which is as follows:—

Referring to the drawings, C represents a valve-casing to the ends of which are bolted end-plates P, P', respectively. Mounted on the valve-casing C and bolted thereto is a T C' forming the compressed air chamber A. The horizontal leg of the T C' is provided with a cover plate P'', while the upper vertical leg receives the main distributing-pipe B. Tapping the T C' opposite the cover plate P'' is a pipe 1, terminating in an angle-valve V, from which leads the pipe 1', and tapping the pipe 1 is a pipe 2 provided with a branch 2'. Mounted on the upper end of the pipe 2 is a pressure gage 3; and mounted on the outer end of the branch 2' is a cup 4. Both the pipe 2 and branch 2' are provided with valves v, v. Projecting from the bottom of the casing C is a flanged hollow boss L between which and a supply-pipe S is bolted a gate-valve G by which the water column is controlled.

The vertical boss L of the casing C is provided with a lining 5 of a suitable non-corroding metal, such as brass, said lining 5 projecting into the inside of the casing C a sufficient distance to provide a suitable seat for a water-valve 6. The upper face of the valve 6 is provided with a threaded boss 7 which receives a hollow threaded cup or member 8 on the inside of which freely plays the nut n passed over the screw-threaded end of a stud-bolt 9 projecting through an opening o in the roof of the hollow member 8. The stud-bolt 9 is also screwed to and through a lever 10 hinged at one end to a stud or bracket 11 carried by the wall of the casing C, a hinge-pin 12 being provided for this purpose.

Above the water-valve 6, and in axial alinement therewith, is an air-valve 13 adapted to seat on the annular flange 14, projecting from the upper wall of the casing C. The air-valve 13 is provided on its upper surface with a pair of lugs 15, 15, to which is pivoted one end of a hinge-link 16 by means of a pin 17. The opposite end of the link 16 has a member 18 hinged thereto by means of a pin 19, said hinge-member terminating in a loop a traversed by the depending arm of a bent anchor pin 20 secured to the wall of the T C'. (Fig. 2.) The free end of the depending arm of the pin 20 is provided with a nut 20' to prevent the hinge-member 18 from sliding off the arm. Secured to the under side of the air valve 13, are a pair of lugs 21, 21, between which is pivoted a pendant 22 terminating in a tip 23.

Secured to the inside of the upper wall of the casing C and depending therefrom is a supporting-member or hanger 24 provided with a slot s and terminating in an enlarged base 25 below the slot, said base being provided with a transverse groove $g$. Projecting from the base 25 is a ledge 26 for a purpose to be presently described. A lever 27, one end of which is provided with a groove $r$ for receiving the tip 23 of the pendant 22, is supported by the base 25 along a fulcrum ridge $l$, said ridge being positioned to one side of the center of the lever 27, to wit, the side toward the end receiving the tip $r$. However, the location of the ridge $l$ is not important and may be varied at will by a corresponding adjustment of the other parts of the mechanism. On the inside of the bottom of the casing C, in alinement with the member 24 is secured a plate 28, provided with a notch $m$ adapted to receive the toe $t$ of a boot-shaped lever 29, which is likewise provided with a heel $h$ opposite the toe $t$. Between the heel $h$ and toe $t$ the lever 29 is undercut so as to provide a shoulder $u$ adjacent the lever 10 and against which the free end of said lever bears with a closed position of the valves. The upper end of the lever 29 is forked, thus providing an open slot $s'$ through which passes a block 30 having a groove $w$ across its upper face for receiving a pin 31 mounted in the end of the fork members (Fig. 2). One end of the block 30 rests on the ledge 26 of the supporting-member 24 (or base 25 thereof), while a link 32 is adapted to pass over the opposite end of said block and the adjacent end of the lever 27, thereby binding said adjacent ends of said lever and block together. The heel $h$ of the lever 29 is provided with a transverse groove $e$ between which and the groove $g$ in the base 25 is confined a disk or strut 33, which preferably has a slightly oblique disposition, (the grooves $e$ and $g$ not being in vertical alinement).

Mounted on the casing C adjacent the T C' is a circuit-closing device D, communicating with the interior of said casing and adapted to close an electric fire-alarm circuit (not shown), all of which is well understood in the art. Tapping the under side of the casing C opposite the circuit-closer D is a drain-pipe 34 provided with a ball check-valve 35, and an ordinary drain-valve 36.

Having described the several parts of the invention I will now explain the operation, which is as follows: Let us assume that the valve-mechanism has been released as a result of a reduction of air pressure in the main B, and that it is desired to reset the same and place it in operative condition. To do this we must first close the gate-valve G to cut off the water-pressure in the supply-pipe S, from the water-valve 6, and permit the valve 6 to be seated upon the upper edge of the bushing or lining 5. This is accomplished by removing the plate P' and lowering the valve to seated position. It is then necessary to see that the air-valve 13 is seated air-tight upon the seat 14, which we accomplish by reaching into the chamber A (the plate P' being still removed) and lowering the valve to its seat and then subsequently pouring sufficient water into the cup 4, communicating with the air-chamber A by means of the pipes 2', 2, 1, to provide the valve 13 with a water-seal on about a level with the dotted line $x$ (Fig. 2), the quantity of water poured being gaged by experience. Compressed air is then admitted to the sprinkler-pipes and main B, in any suitable manner, whereupon the chamber A will likewise be filled with compressed air and the valve 13 be subjected to a predetermined pressure indicated by the gage 3, communicating with said chamber A. Having seated the air-valve 13, we next proceed to arrange the valve mechanism in articulated relation as shown in Fig. 2, and as already described. The gate-valve G is now opened and the main column of water is allowed to bear against the under surface of the water-valve 6 with its full pressure which we will suppose is 150 pounds per unit of area in the present instance. Should the valve 6 leak we proceed to more firmly seat it by screwing the bolt 9 in the proper direction as is apparent from the drawings (Fig. 2). The purpose of the nut $n$ is to prevent the valve 6 from separating from the bolt 9 when said valve opens. Now it is quite obvious that the water-pressure bearing against the valve 6 causes the free end of the lever 10 to bear with considerable force against the shoulder $u$ of the lever 29, tending thereby to impel said lever in an upwardly direction, which movement is restrained, however, by the disk 33 interposed between the heel $h$ of the lever and the groove $g$ of the base 25 of the member 24. With the disk 33 resisting an upward movement of the lever 29 it is apparent that said lever, if it moves at all, must assume an oscillating motion about the toe $t$ as a center, the end of the lever 10 engaging the shoulder $u$ of the lever 29 forcing the latter away from the bottom of the disk, thereby breaking the connection between the parts 29 and 25. In this oscillatory movement of the lever 29, the block 30 is caused to leave its support on the ledge 26 of the member 24, a very slight oscillatory movement of the lever 29 as heretofore mentioned, operating to rock the block 30 to an oblique position by virtue of its engagement with the pin 31 mounted in the forked end of the lever 29. Now, such a movement of the block 30 will cause a downward draft on the coupling-link 32 and as a consequence rock the lever 27 as indicated (dotted, Fig. 2). The result of thus rocking the lever 27 is to lift the short arm of the lever and unseat the air-valve 13, the pendant 22, suspended from the valve 13, articulating with the end of the lever-arm adjacent thereto.

It will be seen from the foregoing explanation that in order for the water-valve 6 to be unseated in the slightest degree, the air-valve 13 will have to be forced upward through the medium of the intermediate link mechanism. This can only happen when the air-pressure in the chamber A has been reduced below that necessary to resist or offset the pressure in the water-supply S. It is apparent that as soon as the displacement of the parts above referred to takes place, the block 30 will slip from the ledge 26, and the link 29, lever 27 and disk 33 will drop to the bottom of the casing C as shown (dotted Fig. 3) thus leaving the valve 6 free to be forced open under the pressure behind it. The water then rushes past the valve 6 filling the valve-casing C and forcing open the air-valve 13, past which it also rushes before reaching the distributing-pipe B, whence it finds its way into the sprinkler-pipes, displacing the air which is within them. When the fire in the building is extinguished the water-supply is shut off by closing the gate-valve G, and upon opening the valve V the sprinkler-pipes are drained through the pipes 1, 1', which lead to the sewer.

When the valve is not in operation, a circulation of air is assured in the casing C, by virtue of the ball check-valve 35, the same being open under normal conditions; but as soon as the water-valve 6 opens and the casing C becomes filled with water, the pressure thereof will close the valve 35 so as to prevent leakage (Fig. 3). After the gate-valve G has been closed and it is desired to drain the casing C, the valve 36 is opened and the water is conducted to the sewer by the pipe 34. When the water-valve 6 is forced open, the air-valve 13 may be struck with considerable force by the water column, or the force may be directed against it at a point beneath the hinge-pin 19. It is to enable the valve 13 to open more readily, in these instances, that the hinge-member 18 is made slidable on the depending arm of the anchor-pin 20, the sliding connection allowing the valve to yield instantly to the pressure of the water column aforesaid, under the above conditions.

It is apparent that the present application is susceptible of various modifications of construction without departing from the spirit of the invention.

Having described my invention, what I claim is:

1. In a valve-mechanism for fire-extinguishers, the combination with a source of water-supply, a suitable casing, a hinged member mounted therein, a water-valve carried by said member, a suitable air-valve, a supporting member in said casing, a lever fulcrumed on said supporting member, an irregularly shaped lever provided with a shoulder against which the free end of the hinged member bears, connecting means between said levers, and a strut opposite the shoulder interposed between the irregularly shaped lever and supporting member to restrain the lever from upward displacement.

2. In a valve-mechanism for fire-extinguishers, the combination with a source of water-supply, a suitable casing, an air-chamber above said casing, an air-valve between said chamber and casing, provided with a hinge-link, a slidable hinge-member coupled to said link, a water-valve, and a series of coördinating members interposed between the water-valve and the air-valve, substantially as set forth.

3. In a valve-mechanism for fire-extinguishers, the combination with a source of water-supply, a suitable casing, a hinged member mounted therein, a water-valve carried by said member, a suitable air-valve, a supporting member in said casing, a lever fulcrumed on said supporting member, a grooved plate secured on the inside of the casing, an irregularly shaped lever provided with a toe adapted to engage the grooved plate, said lever being further provided with a shoulder against which said hinged member bears, a ledge projecting from the aforesaid supporting member, a slot in the end of said lever opposite the toe thereof, a block traversing said slot having one end engaging the ledge of the supporting member, a link passed over the opposite end of the block and the adjacent end of the first mentioned lever, a pendant suspended from the air-valve against which the opposite end of the lever bears, and a pin spanning the slot in the end of the irregularly shaped lever and bearing at an intermediate point on the aforesaid block, substantially as set forth.

4. In a valve mechanism for fire-extinguishers of the character described, a casing having an intake opening communicating with a source of water supply, a valve for normally closing said opening, a member hinged within the casing and coupled to said valve, an air chamber communicating with the interior of the casing through a water-discharge opening located at a point axially alined with the intake opening of the casing, an air-valve normally closing said discharge opening, the air chamber being open to discharge its contents into a suitable main, a link hinged to the air-valve, a member jointed to said link, a fixed support having a sliding connection with the last mentioned member, a pendant leading from the air-valve into the casing, a fixed support in the casing, a lever fulcrumed to the support and having one end engaged by the lower end of the pendant, a ledge formed on the support aforesaid, a block having one end resting on said ledge, a link suspended from the opposite end of the lever and passed over the adjacent end of the block, the latter being provided with a transverse groove or depression on its upper face, a terminally forked lever provided with a pin spanning the fork members and engaging the groove aforesaid, the block passing freely between the fork members, a grooved plate in the casing, a toe on the adjacent end of the lever aforesaid engaging said groove, a heel on the lever engaging the adjacent end of the hinged member carrying the water-valve, a strut interposed between the lever and the fixed support within the casing and inclined to the vertical, whereby upon a reduction of pressure in the system and in the air chamber, the members within the casing will collapse, and the valves be automatically forced to open position by the pressure driving the water past the intake valve.

In testimony whereof I affix my signature, in presence of two witnesses.

WILLIAM A. PERRY.

Witnesses:
ALBERT BUSS, Jr.,
JOHN BUSS.

Copies of this patent may be obtained for five cents each, by addressing the "Commissioner of Patents, Washington, D. C."